United States Patent [19]
Iwai

[11] Patent Number: 6,089,717
[45] Date of Patent: *Jul. 18, 2000

[54] PROJECTOR APPARATUS

[75] Inventor: Junichi Iwai, Kanagawa, Japan

[73] Assignees: Sony Corporation, Tokyo, Japan; Texas Instruments Inc., Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/922,034

[22] Filed: Sep. 2, 1997

[30] Foreign Application Priority Data

Sep. 2, 1996 [JP] Japan .................................. 8-250918

[51] Int. Cl.$^7$ ............................. G03B 21/00; G03B 21/26
[52] U.S. Cl. ................................................ 353/31; 353/34
[58] Field of Search .................................. 353/30, 31, 34, 353/37, 33; 358/55, 60, 64; 349/8, 9; 359/629, 634, 638–640, 831, 834

[56] References Cited

U.S. PATENT DOCUMENTS

| | | | |
|---|---|---|---|
| 3,932,027 | 1/1976 | Cook et al. | 350/173 |
| 4,035,836 | 7/1977 | Miyaji et al. | 358/55 |
| 4,084,179 | 4/1978 | Sekiguchi | 358/55 |
| 4,589,015 | 5/1986 | Nakata et al. | 358/55 |
| 4,913,528 | 4/1990 | Hasegawa | 350/286 |
| 5,648,860 | 7/1997 | Ooi et al. | 349/10 |
| 5,864,374 | 1/1999 | Ito et al. | 348/757 |

FOREIGN PATENT DOCUMENTS

| | | |
|---|---|---|
| 0 364 043 | 4/1990 | European Pat. Off. |
| 0 468 501 | 1/1992 | European Pat. Off. |
| 0 523 988 | 1/1993 | European Pat. Off. |
| 0 723 174 | 7/1996 | European Pat. Off. |

*Primary Examiner*—Safet Metjahic
*Assistant Examiner*—Hung Henry Nguyen
*Attorney, Agent, or Firm*—Frommer Lawrence & Haug, LLP.; William S. Frommer

[57] ABSTRACT

A small-sized and light-weight projector apparatus capable of projecting images of high picture quality. A color separation/synthesis section of a projector apparatus includes a glass block body composed of a plurality of glass blocks combined together in such a manner that the corresponding sides are in close contact with each other; and a plurality of dielectric multilayer films for separating corresponding component rays of white light included in incident light and for synthesizing emitted rays from a plurality of corresponding spatial modulators. Shapes of individual glass blocks are respectively chosen in so that unnecessary rays generated by the reflection or transmission of reflected rays from respective spatial modulators at the corresponding dielectric multilayer films to be transmitted through or reflected from do not travel toward the reflective surface of any of spatial modulators and moreover after the reflection or transmission at the corresponding dielectric multilayer film, the unnecessary rays first enter the surface of the glass block with an incidence less than 30.

7 Claims, 9 Drawing Sheets

PROJECTOR APPARATUS

BACKGROUND OF THE INVENTION

1. Field of the Invention

This invention relates to a color separation/synthesis apparatus and a projector apparatus, and more particularly, is suitably applied to a projector apparatus using a plurality of reflective type spatial modulators.

2. Description of the Related Art

In a projector apparatus capable of projecting an image of large screen, emitted light from a bright light source, such as a xenon or metal halide lamp, is introduced into a spatial modulator to be spatially-modulated in accordance with a video signal, and then thus obtained light is enlarged and projected by means of a projection optical system.

In this case, methods for representing a natural image (color image) considered on such a projector apparatus include a first method in which color information is assigned to each pixel (that is, pixels of three primary colors are prepared for each pixel of the video signal) and a second method in which color information is assigned to a display image in the time division scheme (that is, a red component, a green component, and a blue component of a color image are successively displayed with a triple frequency of a frame frequency.

However, the aforementioned first method has a problem in which the resolution is deteriorated by respectively preparing the three pixels for pixels of the video signal, whereas the second method has another problem in which deterioration of images occurs due to the separation of colors accompanying the motion of a glance.

As one approach to solve such problems, there is a way in which white light emitted from a light source is separated into three primary colors to be spatially modulated in accordance with the respective color components of an image by individual spatial modulators.

Figure 1:
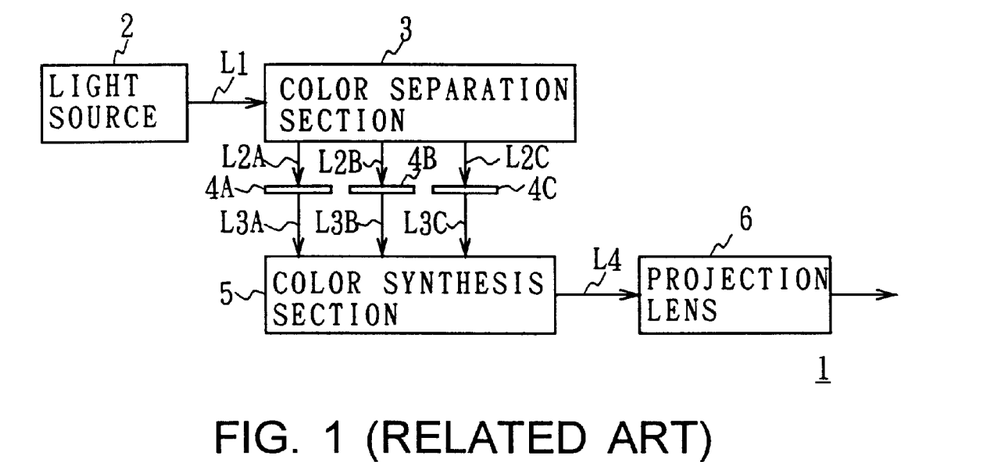
FIGS. 1 to 7 and 9 are schematic diagrams showing the configuration of a conventional projector apparatus.

FIG. 1 shows a general structure of a projector apparatus 1 using transmission type spatial modulators, out of such apparatuses.

Actually, in the projector apparatus 1, white light L1 emitted from a light source 2 is separated into a blue ray L2A, a green ray L2B, and a red ray L2C in a color separation section 3 to be spatially modulated in accordance with the respective color components of an image in corresponding spatial modulators 4A to 4C, and thus obtained blue component L3A, green component L3B and red component L3C of the color image light are synthesized in a color synthesis section 5 and thereafter the resultant color image light L4 is projected via a projection lens 6 to outside.

Figure 2:
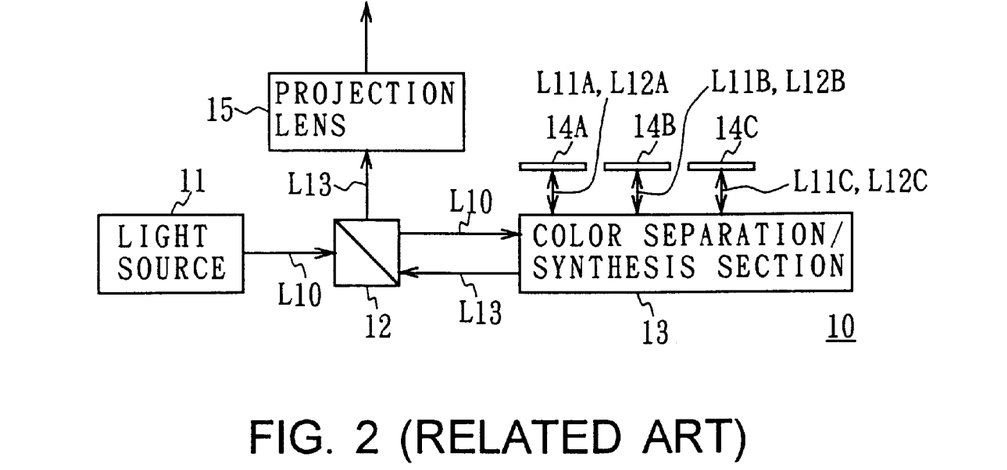
Figure 3:
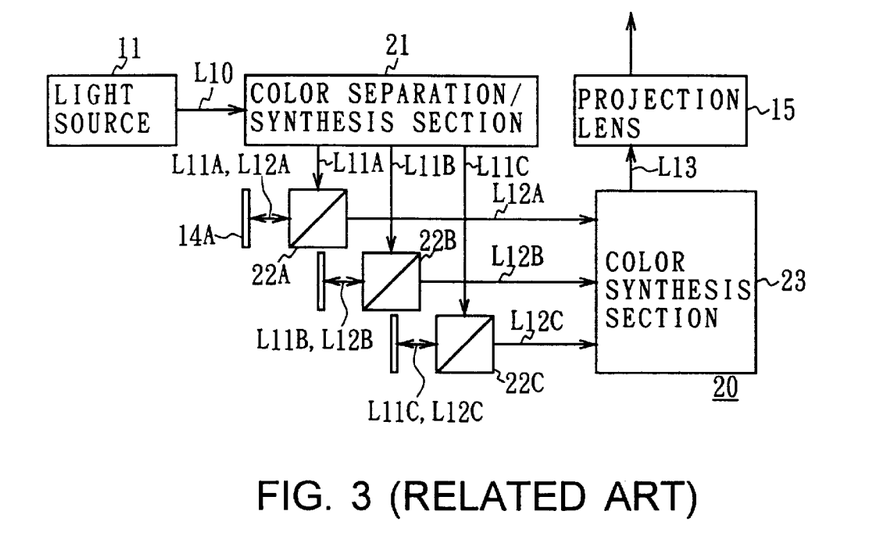

On the other hand, FIGS. 2 and 3 show a general configuration of a projector apparatus 10 using reflective type spatial modulators, out of the aforementioned projector apparatuses.

Actually, in the projector apparatus 10 shown in FIG. 2, white light L10 emitted from a light source 11 is introduced via a beam splitter 12 into a color separation section 13 to be separated into three primary colors, and the obtained blue ray L11A, green ray L11B, and red ray L11C are spatially modulated respectively in corresponding spatial modulators 14A to 14C. Then, color image light L13 is formed by synthesizing the blue component L12A, green component L12B, and red component L12C of the color image light emitted respectively from the spatial modulators 14A to 14C in a color separation synthesis section 13 and is projected to outside via a beam splitter 12 and a projection lens 15 in order.

Further, in a projector apparatus 20 shown in FIG. 3 in which the same reference numerals are applied to parts corresponding to FIG. 2, the white light L10 emitted from the light source 11 is separated into the blue ray L11A, the green ray L11B and the red ray L11C in a color separation section 21, which are then introduced via the respective beam splitters 22A to 22C into the corresponding spatial modulators 14A to 14C to be spatially modulated. Then, the color image light L13 is formed by synthesizing the obtained blue component L12A, green component L12B, and red component L12C of the color image light in a color synthesis section 23 and is projected to outside via the projection lens 15.

In this way, in the projector apparatuses 10 and 20 using reflective type spatial modulators 14A to 14C, though separation means for separating incident/reflective light of the beam splitters 12 and 22A to 22C becomes necessary, the same face side of the spatial modulators 14A to 14C can be used for the separation and synthesis of colors, so that the apparatus has advantage in that the whole apparatus can be downsized as compared with the apparatus using the transmission type spatial modulators 4A to 4C (FIG. 1).

Meanwhile, in such projector apparatuses 1, 10 and 20 (FIGS. 1 to 3) for respectively separating the white light L1 and L10 from light sources 2 and 11 into three primary colors as mentioned above, a two-color dielectric multilayer film (hereinafter, referred to simply as dielectric multilayer film) is ordinarily employed as color separation and synthesis means for incident light.

Figure 4:
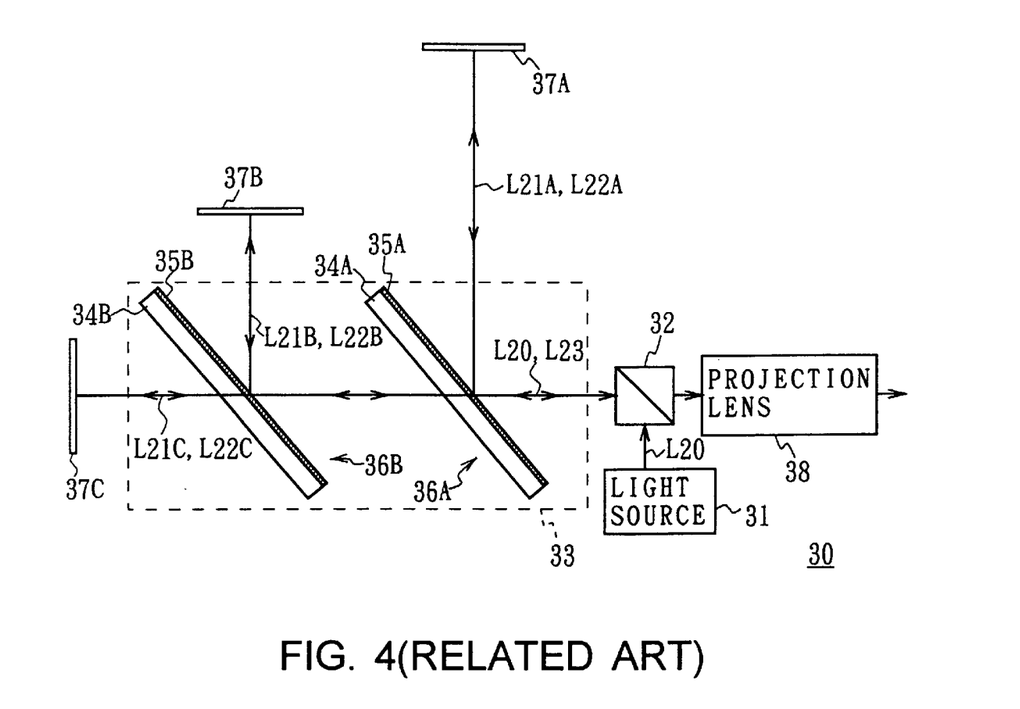

FIG. 4 shows the configuration of a projector apparatus 30 using glass as a holding means for the dielectric multilayer film and a reflective type spatial modulation element.

Actually, in the projector apparatus 30, white light L20 from a light source 31 is introduced into a color separation/synthesis section 33 via a beam splitter 32 and is sequentially color-separated by first and second dielectric mirrors 36A and 36B composed by respectively forming dielectric multilayer films 35A and 35B on one side of glass plates 34A and 34B.

Besides, in the projector apparatus 30, blue ray L21A, a green ray L21B and red ray L21C obtained by the color separation are respectively introduced into corresponding first to third spatial modulators 37A to 37C to be spatially modulated in accordance with a video signal which is supplied.

In such manner, in the projector apparatus 30, a blue component L22A, a green component L22B, and a red component L22C of color image light based on the video signal, which are emitted from the first to third spatial modulators 37A to 37C are synthesized by the first and second mirrors 36A and 36B in the color separation/synthesis section 33 and the obtained color image light L23 is emitted to outside via a projection lens 38.

However, such the projector apparatus 30 has problems that astigmatism occurs in component rays (red and green rays) of the white light L20 transmitted through the first and second dielectric mirror 36A and 36B due to the width of the first or second dielectric mirror 36A or 36B, and on the other hand, aberration occurs in component rays (blue and green rays) of the white light L20 reflected from the first or second dielectric mirror 36A or 36B due to stress-strain. In this case, a tradeoff relation between the stigmatism due to the width of the first or second dielectric mirrors 36A and 36B and the aberration due to stress-strain has a problem in that it is difficult to obtain highly resolution images as projected images.

Figure 5:
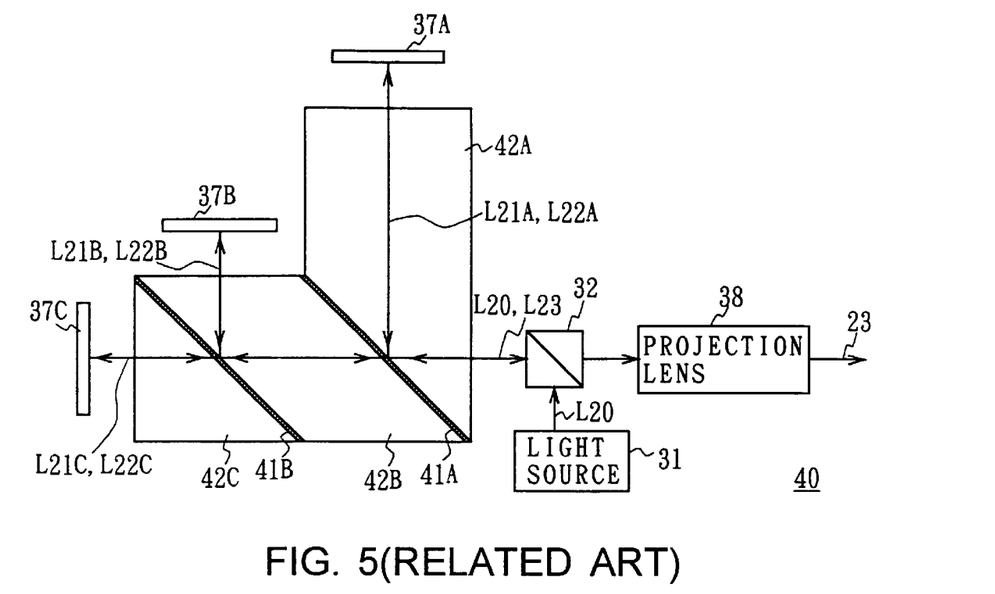

As one approach to solve such problems, as shown in FIG. 5 in which the same reference numerals are applied to parts corresponding to FIG. 4, there is a way to use glass blocks 42A to 42C as a holing means for dielectric multilayer films 41A and 41B. The way has advantage in which the stress can be reduced as compared with a case of using a glass plate as a holding means for dielectric multilayer film and also has advantage in which the length of an optical path to the projection lends 38 can be shortened. Note that, FIGS. 6 and 7, in which the same reference numerals are applied to parts corresponding to FIG. 5, show the configuration of a projector apparatus using spatial modulators in which it is necessary to unify the number of reflections (all to odd or even) during the synthesis of colors.

Figure 6:
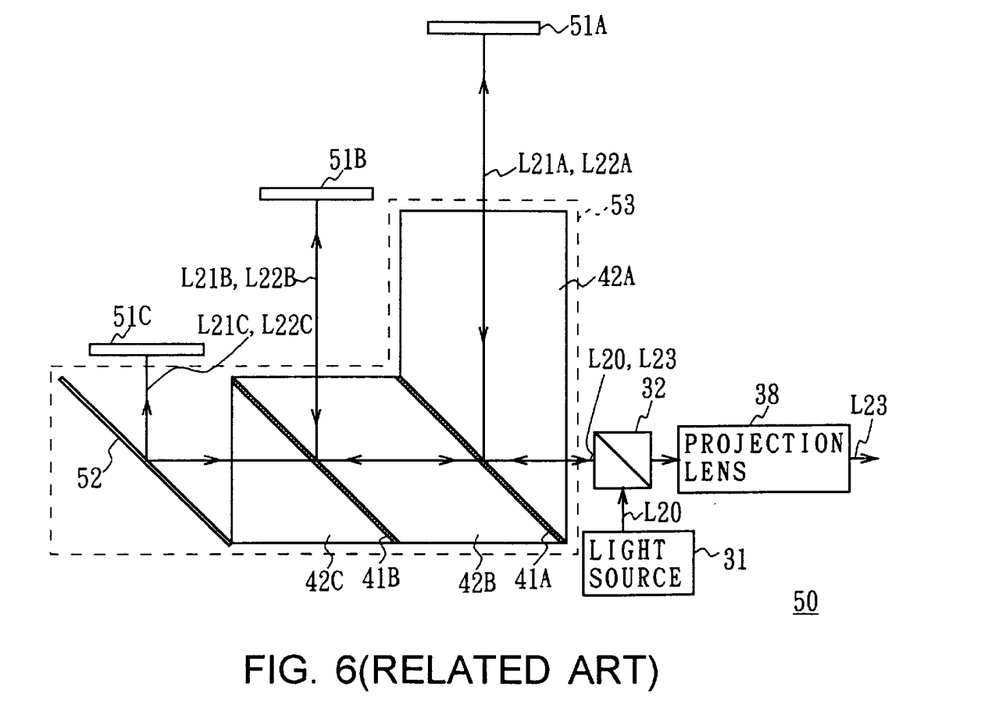
Figure 7:
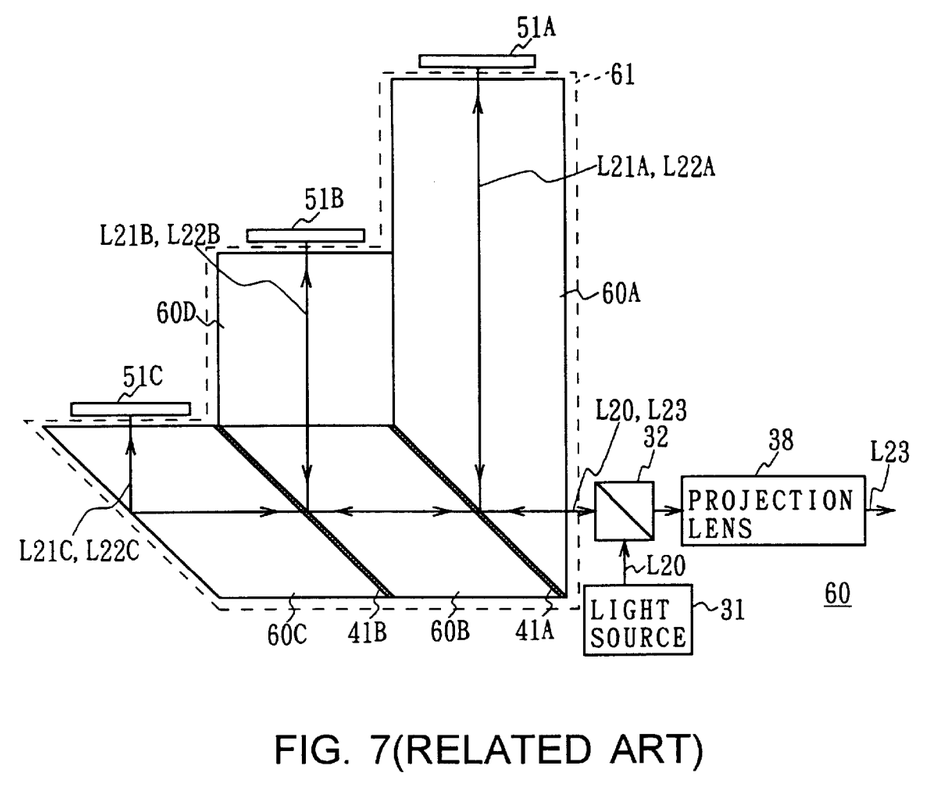

However, projector apparatuses 40, 50, and 60 using glass blocks 42A to 42C or 60A to 60D as a holding means for such dielectric multilayer films 41A and 41B have problems in that the large glass blocks 42A to 42C and 60A to 60D are heavy and expensive, and also have an essential problem in that the color purity of separated and formed blue ray L21A, green ray L21B, and red ray L21C is insufficient.

Figure 8:
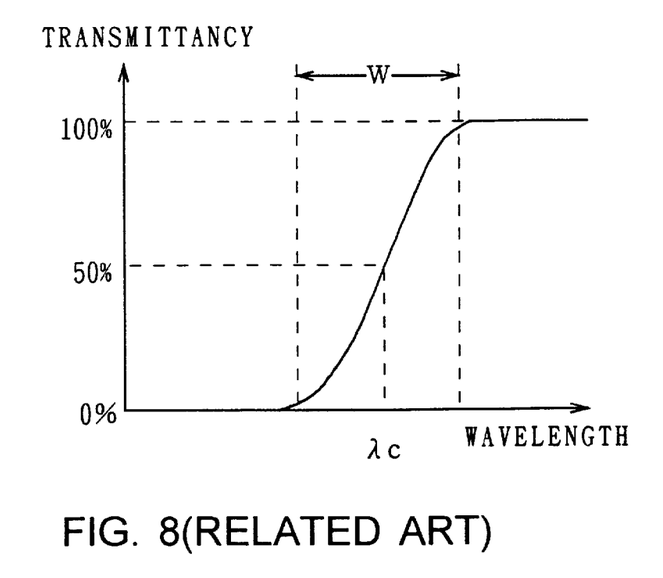
FIG. 8 is a graph of a characteristic curve explaining wavelength characteristics of a dielectric multilayer film.

This reason is that the wavelength characteristic of a dielectric multilayer film generally has a certain degree of rising width "W" as shown in FIG. 8, and in the case where the white light is irradiated to the dielectric multilayer film with an incidence angle of 45°, the component rays of the wavelength range of intermediate colors included in the white light L20 are mixed with the transmitted light and reflected light of the dielectric multilayer films 41A to 41C (FIGS. 5 to 7) because the rising width "W" for the white light L20 incident to the dielectric multilayer films 41A to 41C having both sides in contact with glass blocks 42A to 42C or 60A to 60D (FIGS. 5 to 7) is wider than that of the dielectric multilayer films 35A and 35B formed on one side of the glass plates 34A and 34B (FIG. 4) (in the latter, another side of the dielectric multilayer films 35A and 35B faces the air having a refractive index of one).

Furthermore, for example, the projector apparatuses 50 and 60 using spatial modulators 51A to 51C with the need for unifying the number of reflections of individual colors during the color synthesis as shown in FIGS. 6 and 7, have problems of difficulty in the downsizing of the whole apparatus and the simplification of a configuration because an additional mirror 52 (FIG. 6) is required or large-sized glass blocks 60A to 60D of the color separation/synthesis section 61 (FIG. 7) are required as compared with the projector apparatus 40 (FIG. 5) using spatial modulators 37A to 37C (FIG. 5) without need for unifying the number of reflections.

Figure 9:
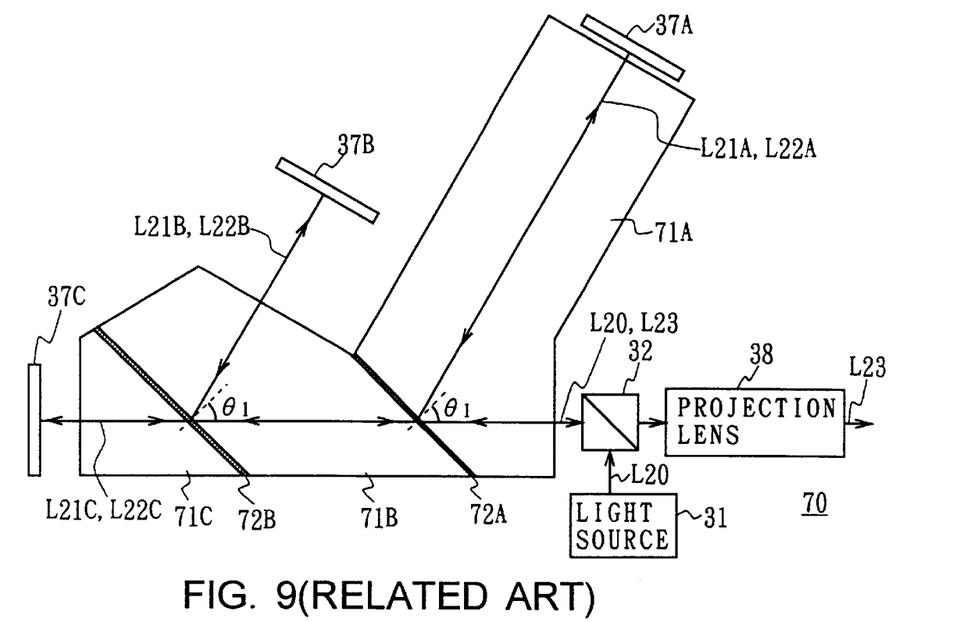

As an improvement method for such a poor color purity, by utilizing the smaller the incidence angle to the dielectric multilayer films 41A and 41B, the narrower is the raising width "W" (FIG. 7) for the incident light of the dielectric multilayer films 41A and 41B, the incidence angle $\theta_1$ of the incident light for the dielectric multilayer films 72A and 72B seems to be smaller than 45° as shown in FIG. 9 in which the same reference numerals are applied to parts corresponding to FIG. 5.

However, there is a problem that the volume of a glass block abruptly becomes larger than the size of a spatial modulator generally if the incidence angle of white light to a dielectric multilayer film deviates from 45° and accordingly there occurs a problem of difficulty in the downsizing and weight reduction of a projector apparatus. Actually, for example, in FIG. 9, with reducing the incidence angle $\theta_1$ of white light L20 to the dielectric multilayer films 72A and 72B, the second spatial modulator 37B comes into touch with the adjacent glass block 71A and accordingly the glass block 71B must be made large in size to avoid this.

Especially in the case where the spatial modulators 51A to 51C (FIGS. 6 and 7) with the need for unifying the number of reflections to even or odd times during the synthesis is used to construct a projector apparatus, a large glass block is required or an additional mirror is necessary in comparison with a case of using the spatial modulators 37A and 37B (FIG. 9) without need for unifying the number of reflections as described above, and accordingly this presents a serious problem in considering the downsizing of the whole projector apparatus.

Figure 10:
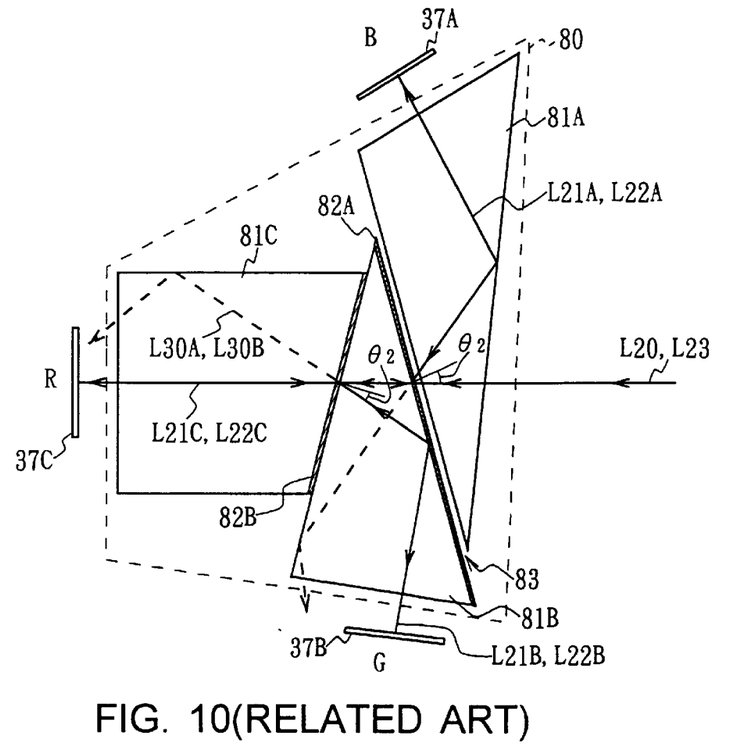
FIG. 10 is a schematic diagram showing a configuration example of a color separation/synthesis section.

As method for solving such problems, for example, by utilizing color separation means employed in three plate type CCD camera, as shown in FIG. 10 in which the same reference numerals are applied to parts corresponding to FIG. 5, it is considered that two triangular prism glass blocks 81A and 81B and a quadrilateral prism glass block 81C of trapezoid bottom are used to construct a color separation/synthesis section 80 in such a manner that the blue ray L21A and green ray L21B obtained by the color separation of white light L20 are (totally) reflected from other places than the dielectric multilayer films 82A and 82B in the corresponding glass blocks 81A and 81B.

Figure 11A:
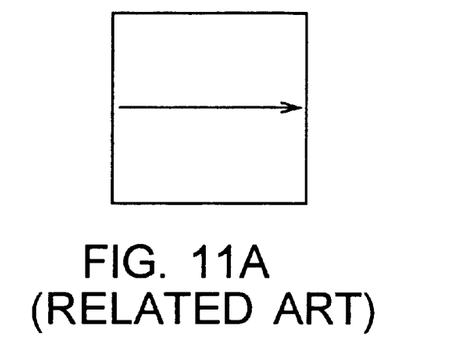
FIGS. 11A and 11B are schematic diagrams explaining a relation between the shape of a glass block and the length of optical path of transmission light.
Figure 11B:
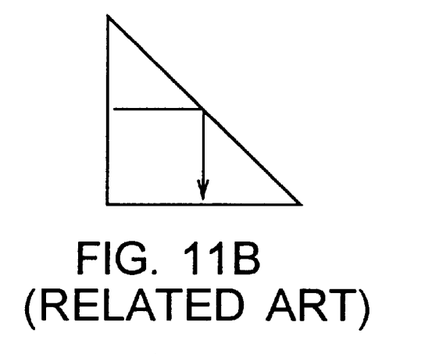

The method has advantage in that the color purity of projected images can be improved and moreover the size of the glass blocks 81A to 81C can be small in comparison with a simple usage described in FIG. 9 because the incidence angle $\theta_2$ to the respective dielectric multilayer films 82A and 82B can be set to about 30° This reason is that, as can be seen from FIGS. 11A and 11B, the volume of a glass block can be reduced to half by the reflection of a transmitted ray even for the same length of an optical path.

However, this method has the following problems.

Let the wavelength characteristic of the second dielectric multilayer film 82B is such as shown in FIG. 8. When light having the wavelength $\lambda_C$ is separated by the second dielectric multilayer film 82B, 50% of the light is reflected from the second dielectric multilayer film 82B and enters the second spatial modulator 37B and the rest 50% is transmitted through the second dielectric multilayer film 82B and enters the third spatial modulator 37C. Then, the two pieces of light are respectively reflected from the corresponding second or third spatial modulator 37B or 37C.

In this case, out of the ray L22B returned to the second dielectric multilayer film 82B from the second spatial modulator 37B, 50% travels toward a projection lens (not shown) by being reflected from the second dielectric multilayer film 82B, but the rest 50% (25% of the original light), ray L30A, is transmitted through the second dielectric multilayer film 82B and enters the third spatial modulator 37C. And similarly, out of the ray L22C returned to the second dielectric multilayer film 82B from the third spatial modulator 37C, 50% is transmitted through the second dielectric multilayer film 82B and travels toward the projection lens, but the rest 50% (25% of the original light), ray L30B, is reflected from the second dielectric multilayer film 82B and enters the third spatial modulator 37C.

If rays L30A and L30B different in the state of transmitting and reflection at the separation and synthesis (hereinafter, referred to as unnecessary rays) enter other spatial modulators 37A to 37C like this, the deterioration of projected images in contrast occurs due to scatter or the like and the color purity of projected images is also affected.

In addition, in the projector apparatus having a color separation/synthesis composed as described above, as can be seen from FIG. 10, a gap 83 is provided between the glass block 81B and the glass block 81A in order to totally reflect green ray L22B reflected from the second dielectric multilayer film 82B inside the glass clock 81B, but if the gap 83 is not adequately small, there are problems that astigmatism occurs and the slenderness ratio of a projected image changes.

Note that, though the influence is small, unnecessary rays may occur in the separation of white light at the first dielectric multilayer film 82A or in the synthesis of the respective rays L22A to L22C from the first to third spatial modulators 37A to 37C.

Thus, in a projector apparatus using a color separation/synthesis section 80 as shown in FIG. 10, since a part of light within the rising range of wavelength for the first and second dielectric multilayer films 82A and 82B become unnecessary rays, it is desirable to use a first and second dielectric multilayer film having a rising range as narrow as possible, but the rising range cannot be made "0" in practice.

SUMMARY OF THE INVENTION

In view of the foregoing, an object of this invention is to provide a small-sized and light-weight projector apparatus capable of projecting an image of high picture quality.

The foregoing object and other objects of the invention have been achieved by the provision of a projector apparatus of which a color separation/synthesis section comprises a glass block body composed of a plurality of glass blocks combined together in such a manner that the corresponding sides are in close contact with each other and a plurality of dielectric multilayer films respectively disposed between predetermined glass blocks for respectively separating corresponding component rays of white light included in the incident light and then reflecting or transmitting the component rays in predetermined entering directions to the corresponding spatial modulators, and for synthesizing the emitted rays from the plurality of corresponding spatial modulators and then projecting it in predetermined directions. The shapes of glass blocks are respectively selected so that unnecessary rays generated by reflecting or transmitting the reflected rays at the corresponding dielectric multilayer films for transmitting or reflecting the reflected rays emitted from the respective spatial modulators can not travel toward the reflective surface of any of spatial modulators and so that the reflected rays are reflected or transmitted at the corresponding dielectric multilayer films and then can first enter the surface of the glass block body with the incidence angle less than 30°.

As a result, about 90% of unnecessary rays can be emitted from the glass block body without entering other spatial modulators and thus the deterioration of projected images in color purity and contrast can be avoided in advance and surely.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 12:
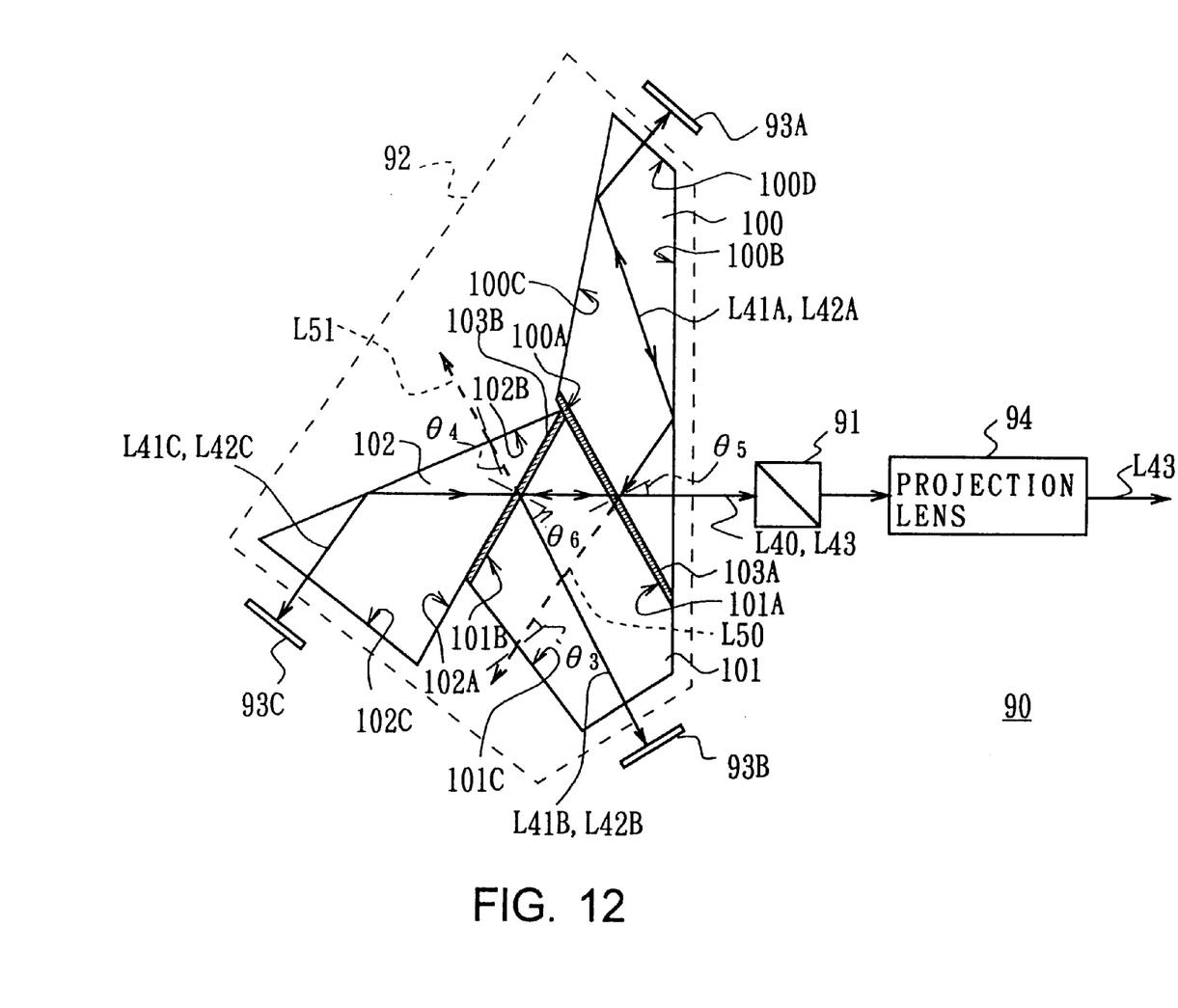
FIG. 12 is a schematic diagram showing the whole configuration of a projector apparatus according to a first embodiment.

Preferred embodiments of this invention will be described with reference to the accompanying drawings:

(1) First Embodiment (1-1) General configuration of a projector according to a first embodiment In FIG. 12, numeral 90 shows a projector according to a first embodiment as a whole, in which white light L40 emitted from a light source not shown in the back-to-surface direction of paper is introduced via a beam splitter 91 into a color separation/synthesis section 92 to be color-separated, and then thus obtained blue ray L41A, green ray L41B and red ray L41C respectively enter surfaces of corresponding first to third reflective type spatial modulators 93A to 93C with a slight slant in the back-to-surface direction of paper.

In the first to third spatial modulators 93A to 93C, corresponding to the pixel array (e.g., 848×600) of respectively supplied image data, minute mirror surface elements of about 16 $\mu$m squares are disposed in the form of a plane to thereby form reflective surfaces.

In this case, the first to third spatial modulators 93A to 93C respectively comprise pixels of image data (i.e., mirror surface elements) and frame memories in which a plurality of memory cells is disposed corresponding the pixels.

Figure 13A:
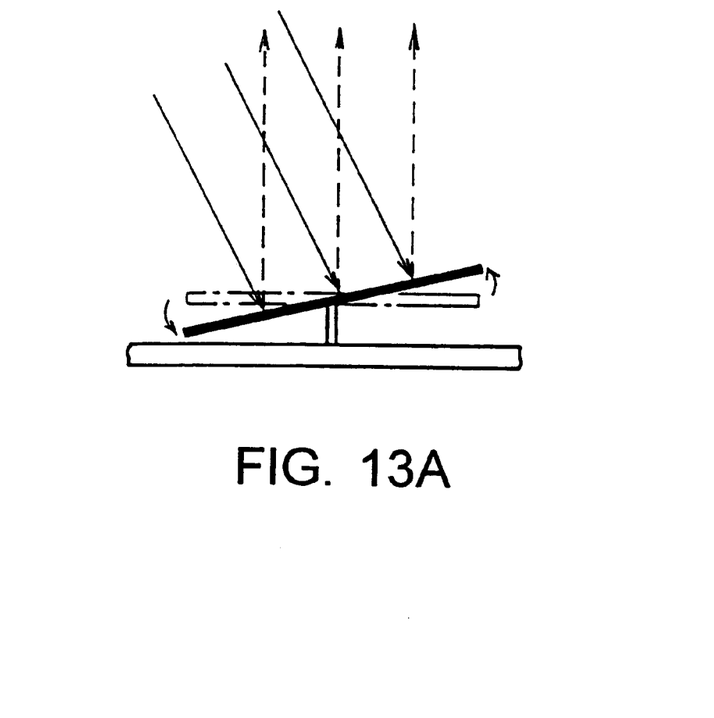
FIGS. 13A and 13B are schematically diagrammatic side views explaining a first to a third spatial modulators.
Figure 13B:
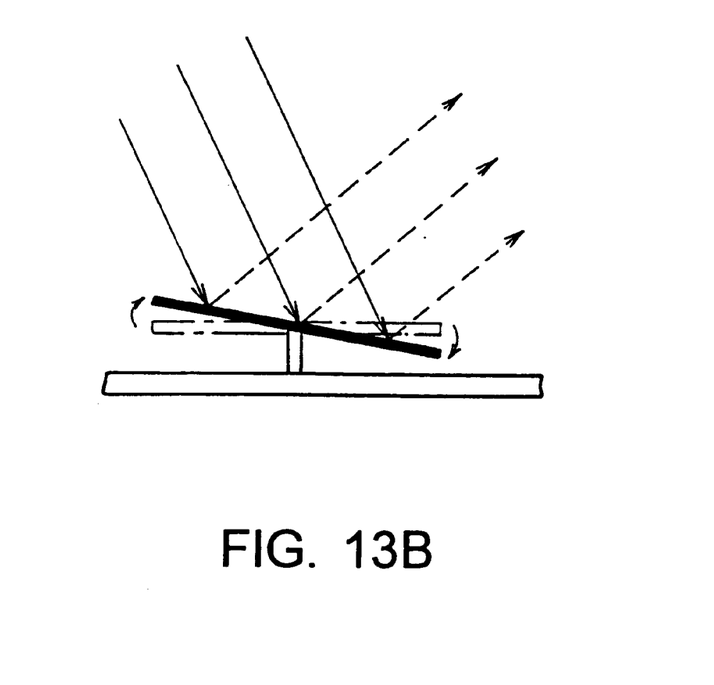

In addition, the frame memory is so arranged that data signals according to the image data respectively corresponding to individual frames are successively supplied to each memory cell thereof and each mirror surface element of the first to third spatial modulators 93A to 93C is so arranged as to be slant at +10° from the neutral position shown by dotted lines in a predetermined direction as shown in FIG. 13A when the corresponding memory cell changing in accordance with the data signal is in the ON state (i.e., valid as a pixel), and on the other hand, to be slant at −10° from the neutral position shown by dotted lines in a predetermined direction as shown in FIG. 13B when the memory cell is in the OFF state (i.e., invalid as a pixel).

In the first spatial modulator 93A, on the basis of the image data which is supplied, only the mirror surface elements corresponding to pixels of the blue color component of a frame image become in the ON state to reflect the blue ray L41A incident thereto in a first direction parallel to the paper of FIG. 12, whereas other mirror surface elements become in the OFF state to reflect the blue ray L41A incident thereto in a different direction from the first direction.

Similarly, in the second spatial modulator 93B, only the mirror surface elements corresponding to pixels of the green color component of a frame image become in the ON state to reflect the green ray L41B incident thereto in a second direction parallel to the paper of FIG. 12, whereas other mirror surface elements become in the OFF state to reflect the green ray L41B incident thereto in a different direction from the second direction.

Further, in the third spatial modulator 93C, only the mirror surface elements corresponding to pixels of the red color component of a frame image become in the ON state to reflect the red ray L41C incident thereto in a third direction parallel to the paper of FIG. 12, whereas other mirror surface elements become in the OFF state to reflect the red ray L41C incident thereto in a different direction from the third direction.

In this way, the blue component L42A, the green component L42B and the red component L42C of color image light on the basis of the image data are respectively emitted from the first to the third spatial modulators 93A to 93C in the first to the third direction parallel to the paper of FIG. 12, which are synthesized at the color separation/synthesis section 92. Then, thus obtained color image light L43 is projected to the outside via the beam splitter 91 and a projection lens 94 in order.

As a result, the projector apparatus 90 irradiates color image light 43 emitted from the projection lends 94 so as to project images based on the image data, on a screen (not shown) disposed on the optical axis of the projection lens 94.

(1-2) Configuration of the color separation/synthesis section according to the first embodiment Here, actually, in the case of the projector apparatus 90, as can be seen from FIG. 12, the color separation/synthesis section 92 comprises a first glass block 100 having a square-shaped bottom, a second glass block 101 having a pentagonal bottom and a third glass block 102 having a triangle bottom, in which the first to third glass blocks 100 to 103 are combined in such a manner that a first side 100A of the first glass block 100 and a first side 101A of the second glass block 101 are in close contact with each other and a second side 101B of the second glass block 101 and a first side 102A of the third glass block 102 are in close contact with each other. Thereby, the glass block body is constituted.

In this case, on the first side 100A of the first glass block 100, a first dielectric multilayer film 103A which allows component rays having the wavelength range longer than that of blue light to be transmitted is laminated, whereas a second dielectric multilayer film 103B which allows component rays having the wavelength range longer than that of green light to be transmitted is laminated on the second side 101B of the second glass block 101.

Thus, in the color separation/synthesis section 92, the blue component (blue ray L41A) of the white light L40 which enters thereto via the beam splitter 91 is obtained by the color separation of the white light L40 at the first dielectric multilayer film 103A and allowed to be totally reflected from the second and third sides 100B and 100C of the first glass block 100 in order and to enter the reflective surface of the first spatial modulator 93A through the first glass block 100, whereas the green component (green ray L41B) of the white light L40 transmitted through the first dielectric multilayer film 103A is allowed to be reflected from the second dielectric multilayer film 103B and to enter the reflective surface of the second spatial modulator 93B through the second glass block 101, and the red component (red ray L41C) of the white light L40 transmitted through the second dielectric multilayer film 103B is allowed to be totally reflected from the second side 102B of the third glass block 102 and to enter the reflective surface of the third spatial modulator 93C through the third glass block 102.

Besides, in the color separation/synthesis section 92, the red component ray L42C of the color image light emitted from the third spatial modulator 93C and the green component ray L42B of the color image light emitted from the second spatial modulator 93B are synthesized at the second dielectric multilayer film 103B, and then the obtained synthesized ray and the blue component ray L42A of the color image light emitted from the first spatial modulator 93A are synthesized at the first dielectric multilayer film 103A, in order to form the aforementioned color image light L43, and the light L43 is delivered to the projection lens 94 via the beam splitter 91 as described above.

In addition to such a configuration, in the case this color separation/synthesis section 92, the shapes of the first to third glass blocks 100 to 102 are selected so that neither a ray L50 (hereinafter, referred to as first unnecessary ray) generated by transmitting or reflecting rays, which are respectively emitted from the first to third spatial modulators 93A to 93C and which are to be reflected from or transmitted through the first dielectric multilayer film 103A, through or from the first dielectric multilayer film 103A nor a ray L51 (hereinafter, referred to as second unnecessary ray) generated by transmitting or reflecting rays, which are respectively emitted from the third spatial modulators 93B and 93C and are which are to be reflected from or transmitted through the second dielectric multilayer film 103B, through or from the second dielectric multilayer film 103B travels toward the reflective surface of the first to third spatial modulators 93A to 93C, and the first to fourth rays L50 to L53 can first enter the surface of the first to third glass block 100 to 102 (i.e., the third side 101C of the second glass block 101 or the second side 102B of the third glass block 102) with incidence angle $\theta_3$ or $\theta_4$ less than 30°.

Therefore, in the color separation/synthesis section 92, about 90% of the first and second unnecessary rays L50 and L52 can be emitted outside the first to third glass blocks 100 to 102 without special processing because the first and second unnecessary rays L50 and L52 first enter the surface of the first to third glass block 100 to 102 with the incidence angle $\theta_3$ or $\theta_4$ less than 30°, and the first and second unnecessary rays L50 and L51 emitted to outside the first to third glass blocks 100 to 102 are preventable from thereafter entering any reflective surface of the spatial modulators 93A to 93C because neither the first nor second unnecessary L50 and L51 travels toward any reflective surface of the first to third spatial modulators 93A to 93C.

Note that, in this embodiment, the first glass block 100 has a selected gradient of the first side 100A with respect to the second side 100B so that the white light L40 can enter the first dielectric multilayer film 103A with an incidence angle $\theta_5$ of about 30°, and the second glass block 101 has a selected gradient of the second side 101B with respect to the first side 101A so that a ray transmitted through the first dielectric multilayer film 103A can enter the second dielectric multilayer film 103B with an incidence angle $\theta_6$ of about 30°.

Therefore, the color separation/synthesis section 92, the wavelength characteristic of the first and second dielectric multilayer films 103A and 103B for incident light can be improved in comparison with a case where light enters the first and second dielectric multilayer films 103A and 103B with an incidence angle of 45°. Thus, the color purity of projection images can be enhanced.

(1-3) Operation and advantages of the first embodiment

According to the above configuration, in the projector apparatus 90, the white light L40 emitted from the light source enters the color separation/synthesis section 92 via the beam splitter 91.

In the color separation/synthesis section 92, the blue component of the incident white light L40 is obtained by the color separation of the white light L40 at the first dielectric multilayer film 103A and the obtained blue ray L41A is irradiated on the reflective surface of the first spatial modulator 93A through the first glass block 100, while the green and red components of the white light L40 are obtained by the color separation at the second dielectric multilayer film 103B, the obtained green ray L41B is irradiated on the reflective surface of the second spatial modulator 93B through the second glass block 101 and the obtained red ray L41C is irradiated on the reflective surface of the third spatial modulator 93C through the third glass block 102.

The blue ray L41A, green ray L41B and red ray L41C respectively irradiated on the reflective surfaces of the first to third spatial modulators 93A to 93C are spatially modulated at the corresponding first to third spatial modulators 93A to 93C in accordance with image data which is supplied, respectively. Then, the red component L42C and the green component L42B of the color image light obtained based on the image data are synthesized on the second dielectric multilayer film 103B of the color separation/synthesis section 92 and the obtained synthesized light and the blue component L42A of the color image light are synthesized on the first dielectric multilayer film 103A of the color separation/synthesis section 92.

Further, in the projector apparatus 90, thus obtained color image light L43 is emitted to the outside via the beam splitter 91 and the projection lens 94 in order and thus a color image based on the image data which is supplied is projected onto a screen disposed on the optical axis of the projection lens 94.

Here, in the projector apparatus 90, as described above, the shapes of the first to third glass blocks 100 to 102 of the color separation/synthesis section 92 are selected so that the first and second unnecessary rays L50 and L51 transmitted through or reflected from the first and second dielectric multilayer films 103A and 103B do not travel toward any reflective surface of the first to third spatial modulators 93A and 93B and moreover the first and second unnecessary rays L50 and L51 first enter the surface of the first to third glass block 100 to 102 with the incidence angles $\theta_3$ or $\theta_4$ less than 30°.

Therefore, as described above, in the projector apparatus 90, the first and second unnecessary rays L50 and L51 are preventable from entering the reflective surfaces of the first and third spatial modulators 93A to 93C almost surely and as a result the deterioration of projected images in contrast and color purity originating from scattering or the like which occurs when the first and second unnecessary rays L50 and L51 enter the reflective surfaces of the spatial modulators 93A to 93C can be prevented in advance.

Besides, in the projector apparatus 90, as described above, since the incidence angles $\theta_5$ and $\theta_6$ of the white light L40 which enters the first and second dielectric multilayer films 103A and 103B are selected to about 30° with respect to the first and second dielectric multilayer films 103A and 103B, the wavelength characteristics for the first and second dielectric multilayer films 103A and 103B can be improved and as a result the color purity of projected images can be enhanced.

Further, in the projector apparatus 90, as described above, since there is no gap between the adjacent first to third glass blocks 100 to 102 and all rays travelling from the first to third spatial modulators 93A to 93C toward the projection lens 94 are reflected odd times in the first to third glass blocks 100 to 102, no additional mirror is required outside the first to third glass blocks 100 to 102 even when the number of reflections must be adjusted as the first to third spatial modulators 93A to 93C and moreover no large glass block need to be used as the first to third glass blocks 100 to 102. Thus, the whole apparatus can be downsized and the configuration thereof can be simplified to such an extent.

Furthermore, in the projector apparatus 90, since all rays which are entered to and emitted from the first to third spatial modulators 93A to 93C are reflected at least once in the first to third glass blocks 100 to 102 of the color separation/synthesis section 92 as mentioned above, small-volume glass blocks can be used as the first to third glass blocks 100 to 102. Thus, the present invention can contribute to the downsizing of a projector apparatus.

According to the above configuration, the shapes of the first to third glass blocks 100 to 102 of the color separation/synthesis section 92 are selected so that neither first unnecessary ray L50 which is emitted from the first or third spatial modulator 93A or 93C and is transmitted through or reflected from the first dielectric multi-layer film 103A nor second unnecessary ray L51 which is emitted from the second or third spatial modulator 93B or 93C and is transmitted through or reflected from the second dielectric multilayer film 103B does not travel toward any reflective surface of the first to third spatial modulators 93A to 93C, and the first and second unnecessary rays L50 and L51, after being transmitted through or reflected from the first or second dielectric mulilayer film 103A or 103B, first enter the surface of the first to third glass blocks 100 to 102 with the incidence angle $\theta_3$ or $\theta_4$ less than 30°. Thereby, deterioration of projected images in contrast and color purity can be prevented in advance and thus a small-sized and light-weight projector apparatus capable of projecting images of a high image quality can be realized.

(2) Second Embodiment

Figure 14:
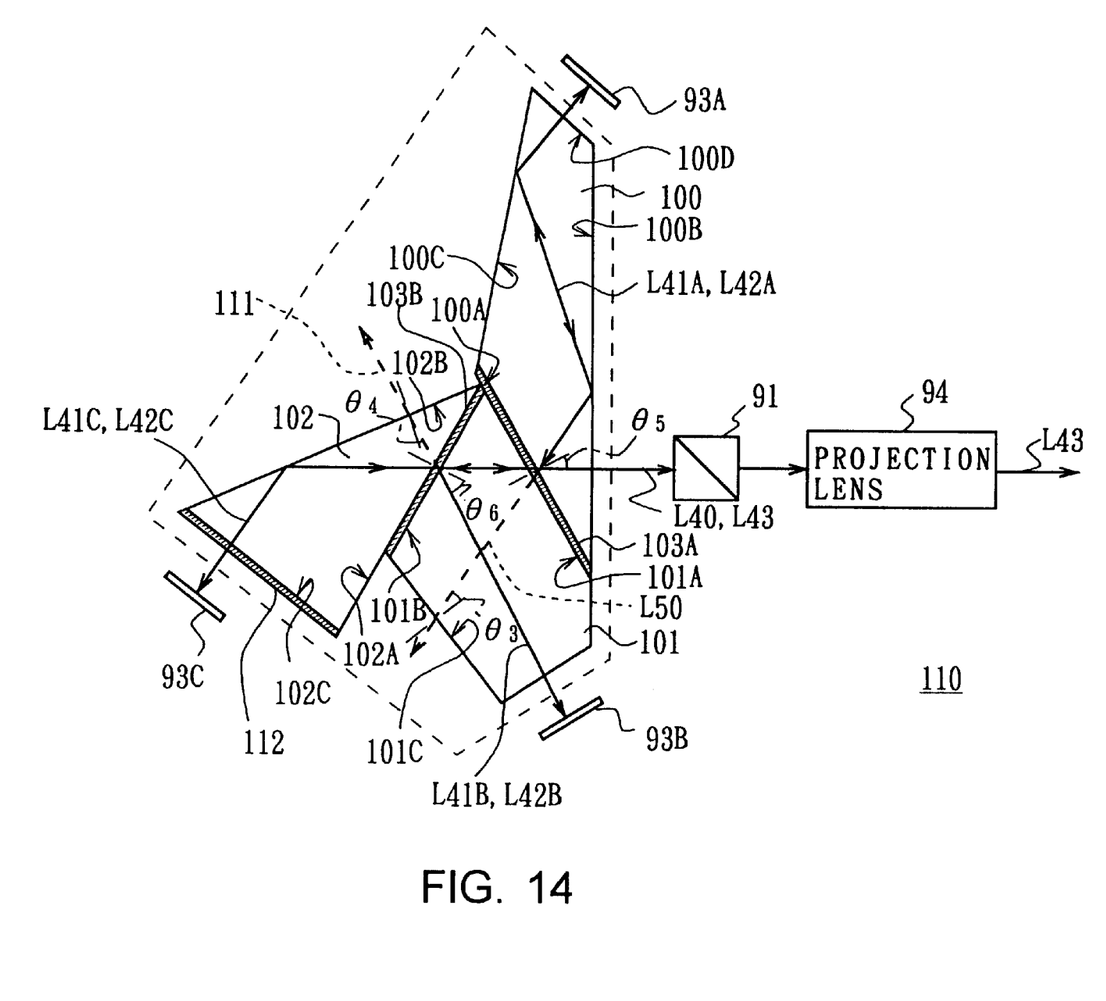
FIG. 14 is a schematic diagram showing the whole configuration of a projector apparatus according to a second embodiment.

FIG. 14, in which the same reference numerals are applied to parts corresponding to those of FIG. 12, shows a projector apparatus 110 according to a second embodiment and is composed as with the projector apparatus 90 (FIG. 12) of the first embodiment except that a third dielectric multilayer film 112 is formed on a third side 102C of the third glass block 102 in a color separation/synthesis section 111, in parallel with and opposed to the reflective surface of the third spatial modulator 93C.

In this case, as the third dielectric multilayer film 112, a film having rising wavelength longer than that of the second dielectric multilayer film 103B is used.

Thereby, in the projector apparatus 110, since the red ray 41C transmitted through the second dielectric multilayer film 103B enters the third dielectric multilayer film 112 with an incidence angle of almost 0°, the yellow component included in the red component can be almost surely removed and thus the red ray L41C having high color purity can enter the surface of the third spatial modulator 93C.

According to the above configuration, in the projector apparatus 110, the red ray L41C transmitted through the second dielectric multilayer film 103B of the color separation/synthesis section 111 is allowed to enter the reflective surface of the third spatial modulator 93C after the removal of the yellow component at the third dielectric multilayer film 112.

Thus, in the projector apparatus 110, since the red ray L41C having high color purity can enter the reflective surface of the third spatial modulator 93C as mentioned above, the color purity of the red component L42C of color image light emitted from the third spatial modulator 93C can be enhanced. Thus, the projector apparatus can project images having high color purity.

In this case, generally, the provision of a dielectric multilayer film on the surface of a glass block of the color separation/synthesis has a merit in the enhancement of color purity, however rays reflected from the dielectric multilayer film are apt to become unnecessary rays, and accordingly absorption filters are often employed usually in place of dielectric multi-layer films. However, this method has a problem of lower transmittance in a desired range of wavelength.

However, in the projector apparatus 110, since the shapes of the first to third glass blocks 100 to 102 are selected so that the first and second unnecessary rays L50 and L51 do not travel toward any reflective surface of the first to third spatial modulators 93A to 93C and the first and second unnecessary rays L50 and L51 first respectively enter the surfaces of the first to third glass blocks 100 to 102 with the incidence angle $\theta_3$ and $\theta_4$ less than 30° as mentioned above, the influence of unnecessary rays emitted from the third dielectric multilayer film 112 is small and consequently an improvement in the color purity of projected images by the dielectric multilayer film 112 is implementable as mentioned above.

According to the above configuration, the third dielectric multi-layer film 112 of rising wave length slightly longer than that of the second dielectric multilayer film 101B is provided on the third side 102C of the third glass block 102 in the color separation/synthesis section 111 employed for the projector apparatus 90 (FIG. 12) according to the first embodiment, so that the color purity of projected images can be enhanced and thus a small-sized and light-weight projector apparatus capable of projecting images of high image quality can be realized.

(3) Other Embodiments

Note that, in the aforementioned first and second embodiments, the present invention applies to the projector apparatus 90 or 110 composed as shown in FIG. 12 or 14, however, the present invention is not limited thereto the present invention is applicable to projector apparatuses of other various configurations, in brief, only if they are so arranged as to separate white light emitted from a light source into a plurality of component rays having a wavelength range in a color separation/synthesis section, spatially modulate the respective component rays in accordance with supplied image data in individual different reflective type spatial modulators and thereafter synthesize and emit the rays emitted from the respective spatial modulators at the color separation/synthesis section.

Besides, in the aforementioned first and second embodiments, the color separation/synthesis sections comprises the first to third blocks of such shapes as shown in FIGS. 12 and 14, however, the present invention is not limited thereto and a shape of each glass block can be of others or a color separation/synthesis section can comprise four or more glass blocks. In brief, shapes and the number of glass blocks constituting the glass block body can be others only if a glass block body is composed by combining a plurality of glass blocks in such a manner as to bring the corresponding blocks into close contact with each other.

Furthermore, in the aforementioned first and second embodiments, the incident white light L20 is divided into three primary colors of a blue ray L41A, a green ray L41B and a red ray L41C, however the present invention is not limited thereto and the white light L20 can be separated into greater number of component rays.

Note that, in this case, it would be advisable that four or more spatial modulators are provided according to the separating number of white light and a plurality of dielectric multilayer films are provided between the predetermined glass blocks in such a manner as to separate the corresponding component rays of the white light individually included in the incident light, which are reflected or transmitted in predetermined directions of entering in the corresponding spatial modulators, to synthesize the rays emitted from the corresponding plurality of spatial modulators and project the resultant light in a predetermined direction.

Furthermore, in the aforementioned second embodiment, the dielectric multilayer film 112 is provided only on the third side 102C of the third glass block 102 which is opposite to the reflective surface of the third spatial modulator 93C, however, the present invention is not limited thereto and a dielectric multilayer film having a rising wavelength shorter than that of the first dielectric multilayer 103A can be provided also on the fourth side 100D of the first glass block 100 which is opposite to the reflective surface of the first spatial modulator 93A. In brief, it is advisable that, corresponding to the emitting positions of emitting a part or all of the component rays of the white light which enter to the corresponding spatial modulator, from a glass block, one or more dielectric multilayer films having the respective predetermined wavelength characteristics are provided on surfaces of the glass block.

Furthermore, in the aforementioned first and second embodiments, reflective type modulators forming a projection scheme based on the difference in the reflection direction of a pixel unit are applied as the first to third spatial modulators 93A to 93C, however, the present invention is not limited thereto and reflective type spatial modulators forming a projection scheme based on the difference in reflection state such as reflectivity, diffusive reflection or polarization can be employed.

As described above, according to the present invention, a color separation/synthesis section of a projector apparatus comprises: a glass block body composed of a plurality of glass blocks combined together in such a manner that the corresponding sides are in close contact with each other; and a plurality of dielectric multilayer films respectively disposed between predetermined glass blocks, for separating corresponding component rays of white light individually included in incident light and reflecting or transmitting the respective corresponding component rays in predetermined entering directions to the corresponding spatial modulators and for synthesizing the rays emitted from the plurality of corresponding spatial modulators and emitting the resultant light in a predetermined direction. And forms of individual glass blocks are respectively chosen so that unnecessary rays generated by the reflection or transmission of reflected rays from respective spatial modulators at the corresponding dielectric multilayer films to be transmitted through or reflected from do not travel toward the reflective surface of any of spatial modulators and moreover at not greater incidence angle than 30 [degree] enter the surface of a glass block body reached first after the reflection or transmission at the corresponding dielectric multilayer film, so that the color purity and contrast of projected images can be enhanced and thus a small-sized and light-weight projector apparatus enabling images of high image quality to be projected can be realized.

Furthermore, in the aforementioned first and second embodiments, the shapes of the first to third glass blocks 100 to 102 are chosen so that all emitted rays (i.e., blue component L42A, green component L42B and red component L42C of color image light) which have entered the glass block body composed of the first to third glass blocks 100 to 102 from the first to third spatial modulators 93A to 93C are reflected odd times inside the glass block body, however the present invention is not limited thereto and the shapes of the first to third glass blocks 100 to 102 can be chosen so that all emitted rays L42A to L42C from the first to third spatial modulators 93A to 93C are reflected even times inside the glass block body composed of the first to third glass blocks 100 to 102.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A projector apparatus for separating white light emitted from a light source into a plurality of component rays respectively having wavelength ranges at a color separation/synthesis section and spatially modulating said component rays by reflective type spatial modulators respectively, and then synthesizing said spatially modulated component rays at said color separation/synthesis section to be emitted, wherein said color separation/synthesis section comprising comprises:

a glass block body comprised of a plurality of glass blocks including a triangular glass block, a four sided polygonal glass block and a five sided polygonal glass block, said glass blocks being combined together such that corresponding sides are in close contact with each other; and a plurality of dielectric multilayer films respectively disposed between said glass blocks, for making predetermined component rays out of said plurality of component rays included in said white light enter said reflective type spatial modulators by reflection and transmission, and for synthesizing emitted rays from said spatial modulators and emitting a synthesized ray in a predetermined direction.

2. The projector apparatus according to claim 1, wherein shapes of said plurality of glass blocks are chosen so that unnecessary ray generated by reflection or transmission of said predetermined component ray at said dielectric multilayer film does not enter any of said spatial modulators.

3. The projector apparatus according to claim 1, wherein shapes of said plurality of glass blocks are chosen so that said component ray reflected from or transmitted through said dielectric multilayer film first enter one of sides of said plurality of glass blocks with an incidence angle less than 30°.

4. The projector apparatus according to claim 1, wherein shapes of said plurality of glass blocks are chosen so that unnecessary ray generated by reflection or transmission of said predetermined component ray at said dielectric multilayer film does not enter any of said spatial modulators and so that said component ray reflected from or transmitted through said dielectric multilayer film first enter one of sides of said plurality of glass blocks with an incidence angle less than 30°.

5. The projector apparatus according to claim 1, wherein said glass block body comprises first, second, third glass blocks, and said plurality of dielectric multilayer films comprises the first dielectric multilayer film disposed between facing sides of said first and second glass blocks and the second dielectric multilayer film disposed between facing sides of said second and third glass blocks.

6. The projector apparatus according to claim 5, wherein said plurality of component rays respectively having wavelength ranges are composed of a blue ray, a green ray, and a red ray; said first dielectric multilayer film reflects said blue ray and transmits said green and red rays and said first glass block makes said blue ray enter a corresponding reflective type spatial modulator; said second dielectric multilayer film reflects said green ray and transmits said red ray and said second glass block makes said green ray enter a corresponding reflective spatial modulator; and said third glass block makes said red ray enter a corresponding reflective type spatial modulator.

7. The projector apparatus according to claim 6, wherein said first glass block reflects said blue ray twice to make said blue ray enter said corresponding spatial modulator, said second glass block makes said green ray enter said corresponding spatial modulator without reflecting said green ray, and said third glass block reflects said red ray once to make said red ray enter said corresponding spatial modulator.

* * * * *